US00RE38400E

(19) United States
(12) Reissued Patent
Kowall et al.

(10) Patent Number: US RE38,400 E
(45) Date of Reissued Patent: Jan. 27, 2004

(54) CONTROL FUNCTION-POWER OPERATED LIFT GATE

(75) Inventors: David J. Kowall, Hartland, MI (US); Delbert D. DeRees, Romeo, MI (US); Thomas S. Moore, Oxford, MI (US); David R. Bernier, Rochester Hills, MI (US)

(73) Assignee: DaimlerChrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/990,822

(22) Filed: Dec. 15, 1997

Related U.S. Patent Documents

Reissue of:
(64) Patent No.: 5,563,483
Issued: Oct. 8, 1996
Appl. No.: 08/383,640
Filed: Feb. 6, 1995

(51) Int. Cl.[7] ..... H02P 5/00
(52) U.S. Cl. ..... 318/283; 318/266; 318/466; 318/286; 318/468; 49/26; 49/280
(58) Field of Search ..... 318/280–286, 318/255–256, 264–268, 445–446, 466–470; 49/26, 139–140, 279–280, 501–502

(56) References Cited

U.S. PATENT DOCUMENTS

| | | | | |
|---|---|---|---|---|
| 3,422,572 A | | 1/1969 | Pollak | |
| 3,713,472 A | | 1/1973 | Dozois | |
| 3,716,945 A | | 2/1973 | Cooper et al. | |
| 4,333,269 A | * | 6/1982 | Bascou | 49/280 |
| 4,533,901 A | | 8/1985 | Lederle | |
| 4,634,945 A | | 1/1987 | Takemura et al. | |
| 4,701,684 A | * | 10/1987 | Seidel et al. | 318/282 |
| 4,728,141 A | | 3/1988 | Motozawa et al. | |
| 4,739,585 A | | 4/1988 | Pickles | |
| 4,813,303 A | | 3/1989 | Beezer et al. | |
| 4,850,140 A | | 7/1989 | Compeau et al. | |
| 5,046,283 A | | 9/1991 | Compeau et al. | |
| 5,069,000 A | * | 12/1991 | Zuckerman | 49/28 |
| 5,155,937 A | | 10/1992 | Yamagishi et al. | |
| 5,250,849 A | * | 10/1993 | Periou | 307/10.1 |
| 5,531,498 A | | 7/1996 | Kowall | |

FOREIGN PATENT DOCUMENTS

| | | |
|---|---|---|
| DE | 3636789 A | 10/1986 |
| JP | 1-314620 | 12/1989 |
| JP | 1-314621 | 12/1989 |

* cited by examiner

*Primary Examiner*—Rina I. Duda
(74) *Attorney, Agent, or Firm*—Thomas A. Jurecko

(57) ABSTRACT

A lift type tailgate on a passenger van type vehicle body is operated by an electric motor powered actuator with an electronic control circuit utilizing a microprocessor operating under program control to respond to user-initiated opening and closing signals to move the tailgate in the selected direction. In the control circuit, feedback information to the microprocessor indicative of tailgate position is provided by a potentiometer coupled with the actuator motor and the microprocessor is programmed to operate with this information to stop the tailgate at a wide open position, a partially closed position and a fully closed position. Obstruction detection is performed by the microprocessor using an obstruction detection circuit and additionally by monitoring the position signal input from the potentiometer to stop the tailgate on encountering an obstacle. Activation of a tailgate latching mechanism is performed under the control of the microprocessor using a solenoid drive circuit and warning or alerting sounds indicating tailgate closure operation including tailgate stoppage at the partially closed position are provided in accordance with audio data received from the microprocessor.

22 Claims, 5 Drawing Sheets

CONTROL FUNCTION-POWER OPERATED LIFT GATE

Matter enclosed in heavy brackets [ ] appears in the original patent but forms no part of this reissue specification; matter printed in italics indicates the additions made by reissue.

TECHNICAL FIELD

This invention relates to motor vehicle lift type tailgate control systems and more particularly to controlling the operation of the tailgate with respect to contacting an obstacle during opening and closing movements and also with respect to its final closing movement.

BACKGROUND OF THE INVENTION

In motor vehicle bodies such as the van type having a lift type tailgate (also called liftgate) that is swung about a horizontal hinge axis at its upper edge to open and close a large rear access opening, it is desirable to have a power actuator for operating the tailgate to relieve a person of the required tailgate operating effort and also as a matter of convenience. Because the tailgate must be lifted upward to open as compared to a tailgate that is hinged about a vertical axis and thus has its weight supported by its hinges, the opening effort required for the former is relatively large because of its unsupported weight and could present a major effort for some people and particularly those with a physical disability. The weight of the tailgate can be offset with counterbalancing devices but a powered tailgate is preferred for convenience as well as serving the disabled. Various forms of powered actuators such as a motor powered linkage system, cable system and crank arm system could be adapted to operate such a tailgate. However, during such powered movement, the tailgate may unexpectedly encounter an obstacle in its path during both opening and closing movement and it is desirable to cease its powered movement in that event to prevent damage to the obstacle and/or the tailgate and its power actuator.

A powered tailgate system that has been proposed and includes a feature for stopping the tailgate movement in such an event is disclosed in co-pending U.S. patent application Ser. No. 08/292,662 filed Aug. 18, 1994 and assigned to the assignee of this invention. In this system, a powered actuator with a reversible DC motor and a worm gear driven crankarm, efficiently operates the tailgate through a roller and guide with gas spring assist. The motor current is monitored by a control circuit that interrupts the power to the actuator motor to stop the tailgate when the current exceeds a certain level as occurs when the tailgate encounters an obstacle. While this system has proven adequate, it has been found that certain further precautionary features with respect to the tailgate operation are desirable and that they can be accomplished in a very cost effective manner with this type of tailgate actuating mechanism.

SUMMARY OF THE INVENTION

The present invention, in addition to providing for very effective stoppage of the tailgate on encountering an obstacle, also provides for automatic stoppage of the tailgate at a partially closed position that is set to leave an opening that would not clamp an obstacle that could quite possibly be encountered such as a package left in the tailgate opening. In addition, an audible signal is provided to alert a person in proximity to the tailgate to the fact that it is closing and a different signal is provided to particularly alert the person operating the tailgate that it has automatically stopped at the partially closed position. This gives the person controlling the operation of the tailgate the opportunity to inspect for an obstacle as the operator is then required to repeat a tailgate closing command to complete its closure movement.

In the preferred embodiment of the invention, a latch mechanism is provided that is operable to latch the tailgate to the vehicle body when the tailgate is swung to a fully closed position and a solenoid is included in the latch mechanism that is operable on energization to unlatch the tailgate. A tailgate power actuator mechanism is provided that is operable to swing the tailgate to open and close the opening. And the tailgate power actuator mechanism includes a reversible electric motor that is operable on energization in an opening mode to swing the tailgate to a fully open position and is operable on energization in a closing mode to swing the tailgate to its fully closed position. An alarm device for alerting persons of tailgate closure operation is provided that is operable on energization in one mode to emit one kind of sound and on energization in another mode to emit another kind of sound indicating a different tailgate closing condition.

An electronic control circuit is provided for operating the solenoid latching mechanism, the actuator motor, and the alarm device. The control circuit utilizes a microprocessor operating under program control to respond to a user-initiated opening or closing signal to move the tailgate in the selected direction. The opening and closing signals are provided by a momentary switch mounted in the vehicle and/or on a remote key fob using wireless communication to signal a remote receiver linked to the microprocessor. In the control circuit, feedback information to the microprocessor indicative of tailgate position is provided by a potentiometer coupled with the actuator motor and the microprocessor is programmed to operate with this information to stop the tailgate at a wide open position, a predetermined partially closed position and a fully closed position. Obstruction detection is performed by the microprocessor using an obstruction detection circuit and additionally by monitoring the position signal input from the potentiometer to stop the tailgate on encountering an obstacle. Activation of the tailgate latching mechanism is accomplished under the control of the microprocessor using a solenoid drive circuit and warning sounds indicating tailgate closure operation are provided using an audio amplifier that drives a loudspeaker in accordance with audio data received from the microprocessor. The audio data is such that one kind of sound is emitted during tailgate closure to the partially closed position and then a different sound is emitted alerting the person controlling the tailgate that it has reached this position. The person controlling the tailgate operation is then required to command a second closing signal to fully close the tailgate and in the meantime has the opportunity to assure that there is no obstruction remaining in the way. The tailgate is automatically stopped as a precautionary measure at the partially closed position which may for example be set to leave a six inch opening to accommodate without contacting an obstacle such as a package containing a fragile object that has been allowed to remain in the tailgate opening.

It is therefore an object of the present invention to provide a new and improved power actuator system for a motor vehicle lift type tailgate.

Another object is to provide a power actuator system for a motor vehicle lift type tailgate arrangement wherein the tailgate is stopped automatically at a wide open position, at a closed position, at a partially closed position but only during closure movement, and on encountering an obstacle during both opening and closing movement.

Another object is to provide a power actuator system for a motor vehicle lift type tailgate wherein one form of sound signal is emitted as the tailgate is initially being closed, the tailgate is automatically stopped on encountering an obstacle and also at a predetermined partially closed position, a different sound signal is emitted at the latter occurrence, and the system must be resignaled to complete tailgate closure.

These and other objects, advantages and features of the present invention will become more apparent from the following description and accompanying drawings wherein:

DETAILED DESCRIPTION OF THE DRAWINGS

Figure 1:
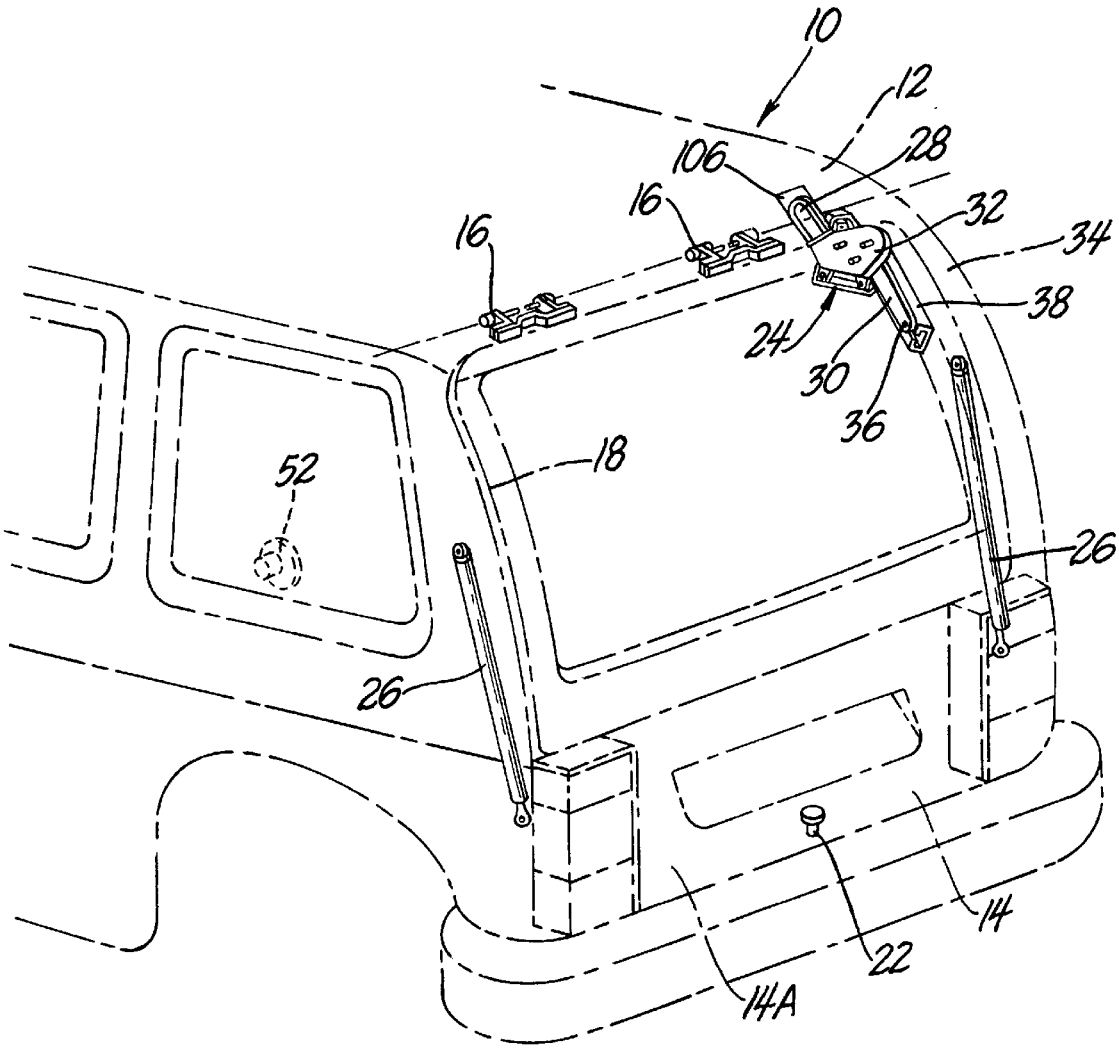
FIG. 1 is a fragmentary perspective view of the rear portion of a passenger van type vehicle having a lift type tailgate operated by an actuator system according to the present invention, the vehicle body and tailgate being illustrated in phantom lines and the tailgate being shown in its fully closed position.
Figure 2:
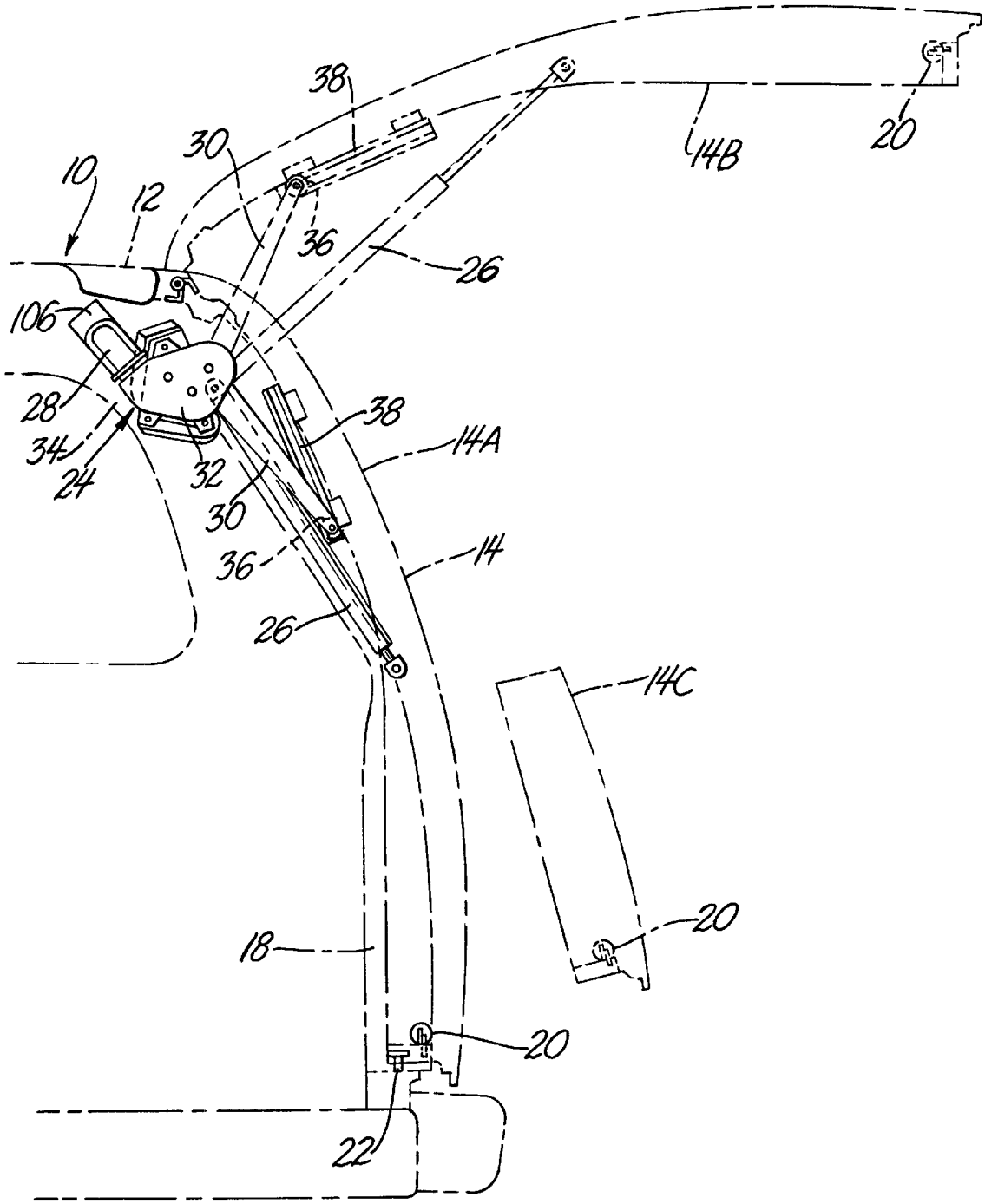
FIG. 2 is a side view of the vehicle in FIG. 1 showing the tail gate in its wide open position and in a predetermined partially closed position.

Referring to FIGS. 1 and 2, there is illustrated a passenger van type motor vehicle 10 including a body 12 and a lift type tailgate 14 that is mounted on the body with hinges 16 to swing about a horizontal axis with respect to a large and substantially vertical opening 18 in the rear of the body. The tailgate 14 is swingable about its hinge axis between a closed position 14A illustrated in FIG. 1 where it closes the opening and a wide open position 14B illustrated in FIG. 2 where it completely uncovers the opening for free access to the vehicle body interior and assumes a slightly upwardly angled uplifted position above horizontal. The tailgate 14 is secured in its closed position by a solenoid operated latching mechanism 20 on the bottom edge of the tailgate that engages a locking bolt 22 mounted on the body at the bottom of the rear opening 18. The tailgate 14 is opened and closed by a powered actuator mechanism 24 with the assist of a pair of gas springs 26 connected between the tailgate and the body.

The actuator mechanism 24, which includes a reversible DC motor 28 that operates a crankarm 30 through a gear reduction drive unit 32, is mounted on one of the rear corner pillars 34 of the body near the upper end thereof. A roller 36 is mounted on the distal end of crankarm 30 and is received and retained in a guide channel 38 that is mounted on the inner side of the tailgate opposite the actuator mechanism. The tailgate is swung between its closed and wide open positions by the roller rolling in the guide channel on pivotal movement of the crankarm in opposite directions by operation of the motor. The structure thus far described including the gas springs 26 and the actuating mechanism 24 (except for the latter not having a clutch in the gear reduction unit) is like that in the aforementioned U.S. patent application Ser. No. 08/292,662 which is hereby incorporated by reference.

DESCRIPTION OF ELECTRONIC CONTROL CIRCUIT

Figure 3:
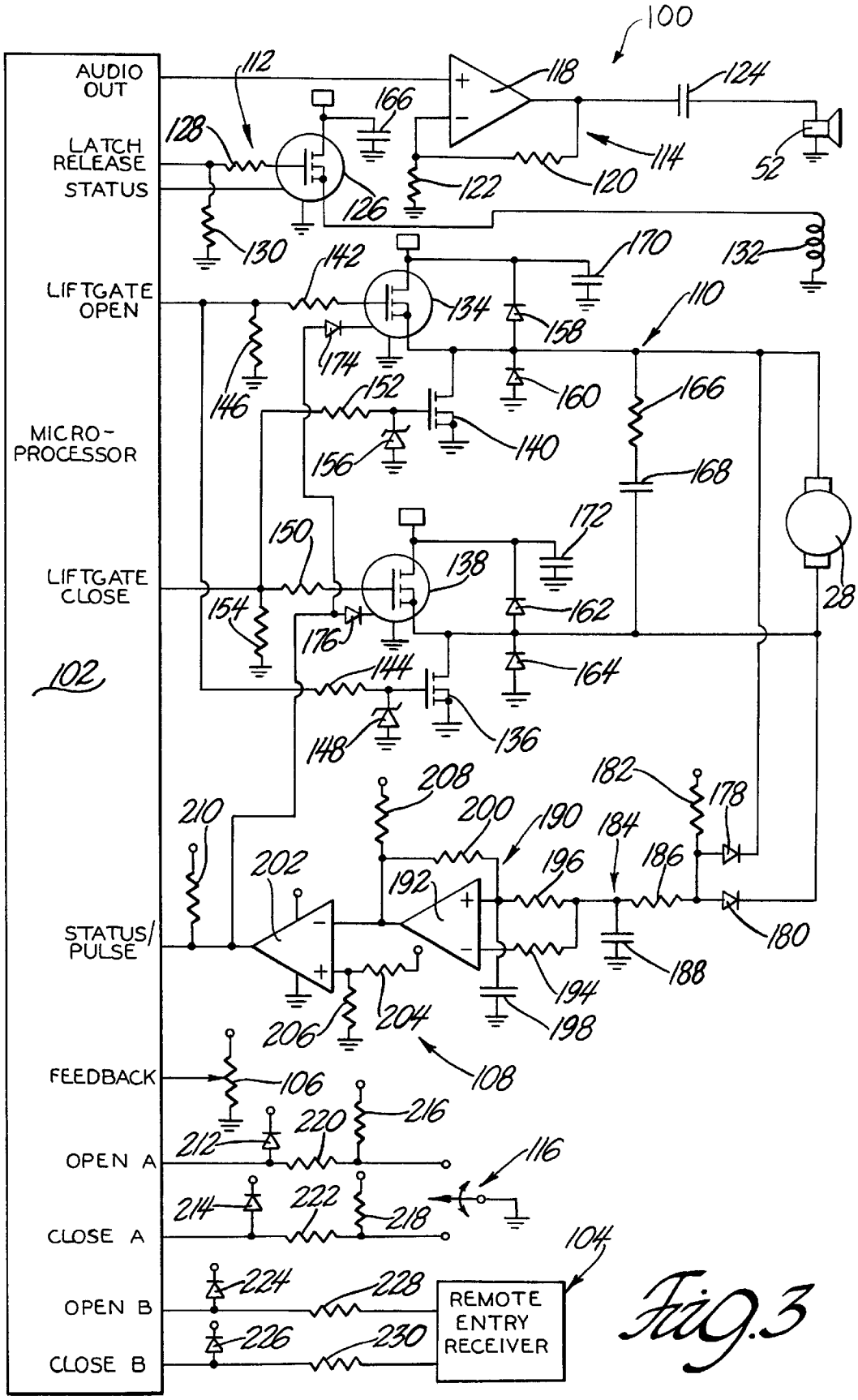
FIG. 3 is a schematic of an electronic control system for operating the tailgate in FIG. 1.

Referring now to FIG. 3, there is illustrated an electronic control circuit 100 for operating solenoid latching mechanism 20, tailgate actuator motor 28, and an alarm device or loudspeaker 52 that is mounted in the vehicle as illustrated in FIG. 1. In general, control circuit 100 utilizes a microprocessor 102 operating under program control to respond to a user-initiated opening or closing signal to move tailgate 14 in the selected direction. The opening and closing signals can be provided by appropriate activation of a momentary switch either mounted within the vehicle or on a remote key fob using wireless communication to signal a remote entry receiver 104 connected to microprocessor 102. Feedback information indicative of tailgate position is provided by way of a potentiometer 106 having a wiper arm coupled for rotation with motor 28. Obstruction detection is performed by microprocessor 102 using an obstruction detection circuit 108 and, additionally, by monitoring the position signal input from potentiometer 106. Operation of motor 28 in both forward (opening) and reverse (closing) directions is accomplished using a motor drive circuit 110 controlled by microprocessor 102. Activation of solenoid latching mechanism 20 is accomplished under control of microprocessor 102 using a solenoid drive circuit 112. Warning sounds in the form of chimes are provided using an audio amplifier 114 that drives loudspeaker 52 in accordance with audio data received from microprocessor 102.

In general, operation of control circuit 100 in response to user-initiated opening and closing signals is as follows. From a fully closed position 14A, opening of tailgate 14 is accomplished by manual activation of momentary switch 116 to provide an opening signal to microprocessor 102. In response to this opening signal, tailgate 14 is unlatched using solenoid drive circuit 112. Motor 28 is then energized in an opening mode using motor drive circuit 110. Once tailgate 14 reaches the fully opened position 14B, as determined by feedback from potentiometer 106, motor 28 is stopped. From a fully opened position, closing of tailgate 14 involves two steps: first, activating switch 116 to move tailgate 14 to a partially closed position 14C shown in FIG. 2 (e.g., six inches from the fully closed position 14A) and, second, thereafter releasing and reactivating switch 116 to move tailgate 14 to its fully closed, latched position 14A. The first step is initiated by activating switch 116 to produce the closing signal and involves energizing motor 28 in a closing mode using motor drive circuit 110 and, while motor 28 is energized, generating a warning sound using loudspeaker 52. Once the partially closed position 14C is reached, motor 28 is switched off and a distinctly different warning sound is provided to indicate that tailgate 14 has reached its partially closed position and switch 116 must therefore be released and depressed again to produce a repeated closing signal. The second step is initiated by the repeated closing signal and involves energizing motor 28 until tailgate 14 has reached its fully closed position and concurrently operating loudspeaker 52 to produce the second warning sound.

With continued reference to FIG. 3, the particular construction and operation of control circuit 100 will now be described. As mentioned above, microprocessor 102 operates under program control to activate solenoid latching mechanism 20, motor 28, and loudspeaker 52 in accordance with inputs received from manual switch 116, remote entry receiver 104, potentiometer 106, and obstruction detection circuit 108. Microprocessor 102 can be a Motorola 68HC11 or other suitable microprocessor and the program for microprocessor 102 can be stored and provided to microprocessor 102 in any conventional manner, such as by using a one-time programmable memory within microprocessor 102.

Audio amplifier 114 receives audio data from a data output of microprocessor 102. This data is provided to the non-inverting input of an op-amp 118. The output of op-amp 118 is connected through a resistor 120 to its inverting input, which is connected through a resistor 122 to ground. The voltage transfer function of audio amplifier 114 therefore depends upon the ratio of resistor 120 to resistor 122. The output of op-amp 118 is ac coupled to loudspeaker 52 by a capacitor 124. Loudspeaker 52 can be a piezoelectric element or other sound generating device, such as a Sonalert Model No. SNP288. Op-amp 118 can be one-quarter of an LM339 quad comparator, manufactured by National Semiconductor. As will be appreciated by those skilled in the art, the sound generated by loudspeaker 52 will depend upon the audio data provided by microprocessor 102 to op-amp 118. Thus, generation of the different warning sounds can be accomplished simply by programming microprocessor 102 to send different sequences of audio data, as desired.

Solenoid drive circuit 112 comprises a MOSFET 126 having its gate connected through a current limiting resistor 128 to receive a latch release signal from a data output of microprocessor 102. The gate is biased to ground by a resistor 130. The drain of MOSFET 126 is connected to a voltage supply (e.g., 12v), with the solenoid 132 of solenoid latching mechanism 20 being connected between ground and the source of MOSFET 126. When the gate of MOSFET 126 is driven to above its threshold voltage by microprocessor 102, MOSFET 126 turns on, providing power to solenoid 132. A capacitor 166 connected between the drain and ground helps protect against noise being generated on the voltage supply line as a result of operation of solenoid 132. Preferably, MOSFET 126 is a tempFET, such as a BTS412A, manufactured by Siemens. This tempFET includes an output that, when connected in circuit as shown, provides a logic low signal to microprocessor 102 in the event of overheating. When asserted, this status signal is used by microprocessor 102 to switch off tempFET 126, thereby protecting the circuit against a failure of solenoid 132 or any other condition that causes excessive current to flow through the tempFET. Solenoid 132 can be Part No. 4615121, manufactured by Hyram Co.

Motor drive circuit 110 is responsive to two signals from microprocessor 102: a tailgate open signal that operates motor 28 in an opening mode and a tailgate close signal that operates motor 28 in a closing mode. Drive circuit 110 utilizes MOSFETs as transistor switches to selectively operate motor 28 to open or close tailgate 14. As will be understood by those skilled in the art, motor 28 can be a dc motor that provides sufficient torque to raise and lower tailgate 14 with the gas spring assist and that is reversible simply by reversing the direction of current through motor 28. For example, motor 28 can be a Rockwell Model No. 56005165. Motor drive circuit 110 has a pair of MOSFETs for driving motor 28 in each of its two direction; in particular, MOSFETs 134 and 136 for driving motor 28 to open tailgate 14 and MOSFETs 138 and 140 for driving motor 28 to close tailgate 14.

The gates of MOSFETs 134 and 136 are connected to a data output of microprocessor 102 through current limiting resistors 142 and 144, respectively, with a pull-down resistor 146 connected to bias the MOSFETs off. The gate of MOSFET 136 also includes a zener diode 148 connected to ground to clamp the gate voltage to a safe level. The drain of MOSFET 134 is connected to a voltage supply (e.g., 12v) and its source is connected to a first terminal of motor 28. The drain of MOSFET 136 is connected to the second terminal of motor 28 and its source is connected to ground. As will be appreciated, when the tailgate open signal is provided from microprocessor 102 to MOSFETs 134 and 136, they each turn on, with MOSFET 134 connecting the first terminal of motor 28 to the voltage supply and MOSFET 136 connecting the second terminal to ground. This results in current flowing through motor 28 such that it turns in one direction (e.g., clockwise) to open tailgate 14. In this way, motor 28 is operated in the opening mode to move tailgate 14 toward its fully open position.

MOSFETs 138 and 140 are connected in a similar manner to operate motor 28 in the closing mode by driving current through motor 28 such that it turns in the opposite direction (e.g., counter-clockwise). The gates of these MOSFETs are connected through resistors 150 and 152, respectively, to receive a tailgate close signal from microprocessor 102. As with MOSFETs 134 and 136, their gates are held low by a pulldown resistor 154 in the absence of the tailgate close signal being asserted. Also, as with MOSFET 136, MOSFET 140 includes a zener diode 156 connected between its gate and ground. The drain of MOSFET 138 is connected to the voltage supply and its source is connected to the second terminal of motor 28. The drain of MOSFET 140 is connected to the first terminal of motor 28 and its source is connected to ground. As will be appreciated, when the tailgate close signal is provided from microprocessor 102 to MOSFETs 138 and 140, they each turn on, with MOSFET 138 connecting the second terminal of motor 28 to the voltage supply and MOSFET 140 connecting the first terminal to ground. This results in motor 28 being operated in the closing mode to move tailgate 14 toward its fully closed position.

Clamping diodes 158 and 160 are used to protect MOSFETs 134 and 140 upon motor 28 being switched off. Diode 158 is connected between the common node of MOSFETs 134 and 140 (i.e., the source of MOSFET 134 and the drain of MOSFET 140) and the voltage supply to prevent the voltage at that node from exceeding the voltage supply. Diode 160 is connected between that common node and ground so as to prevent the voltage at that node from falling below ground. In the same manner, diodes 162 and 164 protect MOSFETs 136 and 138. Motor drive circuit 110 also includes a snubber connected across the first and second terminals of motor 28 to absorb the energy stored within the inductance of motor 28 when motor 28 is switched off. The snubber is connected across the terminals of motor 28 and comprises a resistor 166 connected in series with a capacitor 168. Capacitors 170 and 172 are connected between the drains of MOSFETs 134 and 138, respectively, to help protect against noise being generated on the voltage supply line as a result of operation of motor 28.

Preferably, MOSFETs 134 and 138 are tempFETs, such as BTS432D, manufactured by Siemens. Their overtemp (status) outputs are AND-tied by diodes 174 and 176, respectively, to the status/pulse input of microprocessor 102 for the purpose of detecting obstructions to movement of tailgate 14, as will be described below. MOSFETs 136 and 140 are each preferably a BTS131, also manufactured by Siemens. Zener diodes 148 and 156 can each be a 1N4732, manufactured by Motorola.

As mentioned above, potentiometer 106 provides microprocessor 102 with feedback indicative of tailgate position. The potentiometer is a three terminal potentiometer, having its first terminal connected to VCC (e.g., 5v), its second terminal connected to ground, and its third terminal (wiper arm) connected to provide a position signal to an analog data input of microprocessor 102. The Wiper arm is mechanically coupled to motor 28 so that operation of motor 28 moves the wiper arm, thereby altering the voltage provided to microprocessor 102. In particular, the motor is coupled to the wiper arm so that the different tailgate positions (i.e., fully closed, fully open, and all the possible positions in between) each have a correspondingly different resistance. As a result, the voltage of the position signal provided to the microprocesser 102 will be indicative of the position of tailgate 14.

Obstruction detection circuit 108 monitors the ac ripple produced by motor 28 as a result of its operation. It transforms this ripple into a pulse train having a repetition rate equal to the frequency of the ripple. A pair of blocking diodes 178 and 180 have their cathodes connected to the first and second terminals, respectively, of motor 28, with their anodes connected at a common node that is pulled up to VCC by a resistor 182. As will be appreciated, whenever motor 28 is operated in either direction, one of the motor's two terminals will be near ground and, thus, the voltage at the anodes of diodes 178 and 180 will have a dc voltage slightly above ground (e.g., about 1 volt) and will include the ac ripple superimposed on the dc. This signal is then fed through a low pass filter 184 formed by a series resistor 186 and a capacitor 188 to ground. The signal is then provided to an amplifier stage 190 that utilizes an op-amp 192 having its inverting input connected to receive the signal from filter 184 through a resistor 194 and its non-inverting input connected to receive the same signal via a resistor 196. A capacitor 198 is connected between the non-inverting input and ground, with the time constant of resistor 196 and capacitor 198 being selected to be much greater than the period of the ac ripple produced by motor 28.

As will be appreciated, the ac ripple coming from filter 184 will be immediately imposed upon the inverting input of op-amp 192, but will lag behind at the non-inverting input due to charging or discharging of capacitor 198. Thus, the output of op-amp 192 will go high during downward slopes of the ac ripple and will go low during upward slopes of the ac ripple, thereby producing a pulse train having a fifty percent duty cycle and a frequency equal to that of the ac ripple. Hysteresis is provided by positive feedback using a resistor 200 connected between the output of op-amp 192 and its non-inverting input. The ratio of resistor 200 to resistor 196 is set large enough to insure that the peak to peak voltage of the ac ripple is sufficient to cause the output of op-amp 192 to swing between its minimum and maximum levels, but not too large to make the amount of hysteresis negligible.

The output of op-amp 192 is provided to the inverting input of a comparator 202. The non-inverting input of comparator 202 is connected to the common node of a pair of resistors 204, 206 that are connected between VCC and ground to form a voltage divider that provides approximately ½ VCC. Comparator 202 operates to invert the output of op-amp 192 (i.e., convert logical ones to logical zeros and vice-a-versa) and to provide the resulting pulse train with sharp transitions. The output of comparator 202 is provided to the status/pulse input of microprocessor 102. It will thus be appreciated that obstruction detection circuit provides a pulse train during operation of motor 28 in either direction, with the pulse width being equal to one-half the period of the ac ripple produced by motor 28 and the repetition rate being equal to the frequency of the ac ripple. Op-amp 192 and comparator 202 can each be one-quarter of an LM339 quad comparators, manufactured by National Semiconductor. As is known, these devices have open collector outputs and respective pullup resistors 208 and 210 are therefore provided.

Obstruction detection is accomplished in three ways, using two inputs to microprocessor 102. The first method uses obstruction detection circuit 108 to produce a pulse train indicative of the speed of motor 28. The second method uses diodes 174 and 176 to signal microprocessor 102 in the event of an overtemperature condition caused by excessive current flowing through motor 28. The third method of obstruction detection uses potentiometer 106 to monitor the rate of change of position of tailgate 14. These methods, in effect, monitor operation of motor 28 to detect abnormal motor operation associated with excessive back torque on the motor that stops or substantially restricts turning of the motor. The first method involves monitoring by microprocessor 102 of the width of pulses coming from obstruction detection circuit 108. If the pulse width becomes greater than a predetermined amount, as in the case of an obstruction restricting movement of the tailgate and therefore rotation of motor 28, then microprocessor 102 will shut off motor 28 until switch 116 is released and activated again. Alternatively, the microprocessor 102 could monitor the frequency, rather than width, of the pulses and turn of motor 28 if the frequency became too small. Suitable programming of microprocessor 102 to monitor the pulse width and/or frequency and to carry out these functions are well within the level of skill in the art. The second method utilizes the overtemp outputs of MOSFETs 134 and 138 to clamp the status/pulse input of microprocessor 102 to a logic low level in the event of an overcurrent condition, such as when an obstruction provides excessive back torque on motor 28. Microprocessor 102 also monitors its status/pulse input to determine if, during motor operation, that input remains low for greater than a predetermined amount of time. If so, then it is assumed that an overtemp condition has occurred and motor 28 is deenergized. The third method involves monitoring by microprocessor 102 of the rate of change of voltage at its feedback input during motor operation. As mentioned above, the voltage provided to microprocessor 102 by potentiometer 106 is indicative of the position of tailgate 14. Therefore, the rate of change of that voltage is indicative of the rate of change of position of tailgate 14 (i.e., how fast the tailgate is moving). If the rate of change of voltage is less than a predetermined amount, this necessarily means that movement of tailgate 14 has been slowed for some reason and an obstruction is assumed. Thus, microprocessor 102 shuts off motor 28 whenever this condition occurs and will not restart motor 28 until switch 116 (or the appropriate switch on the user's remote entry key fob) is activated again. Although the illustrated embodiment provides three ways in which obstruction detection can be implemented, it will of course be appreciated that any single one of these manners of obstruction detection can be used as a means to provide an obstruction signal to microprocessor 102.

Switch 116 can be a SPDT momentary switch used to provide microprocessor 102 with either an opening or closing signal by connecting either an open A or a close A input of microprocessor 102 to ground. These inputs are clamped to VCC by diodes 212 and 214, respectively, and include pullup resistors 216 and 218, respectively, to hold the inputs at a logic high level when switch 116 is not activated. Respective current limiting resistors 220 and 222 are also provided for protection of microprocessor 102. Microprocessor 102 can also receive an opening or closing signal from remote entry receiver 104 via an open B and a close B input, respectively. These inputs also are clamped to VCC by diodes 224 and 226, respectively and include current limiting resistors 228 and 230, respectively. Remote entry receiver 104 can be a conventional receiver that responds to wireless transmissions from a conventional remote entry key fob. The construction and operation of these remote entry devices are well known.

Figure 4A:
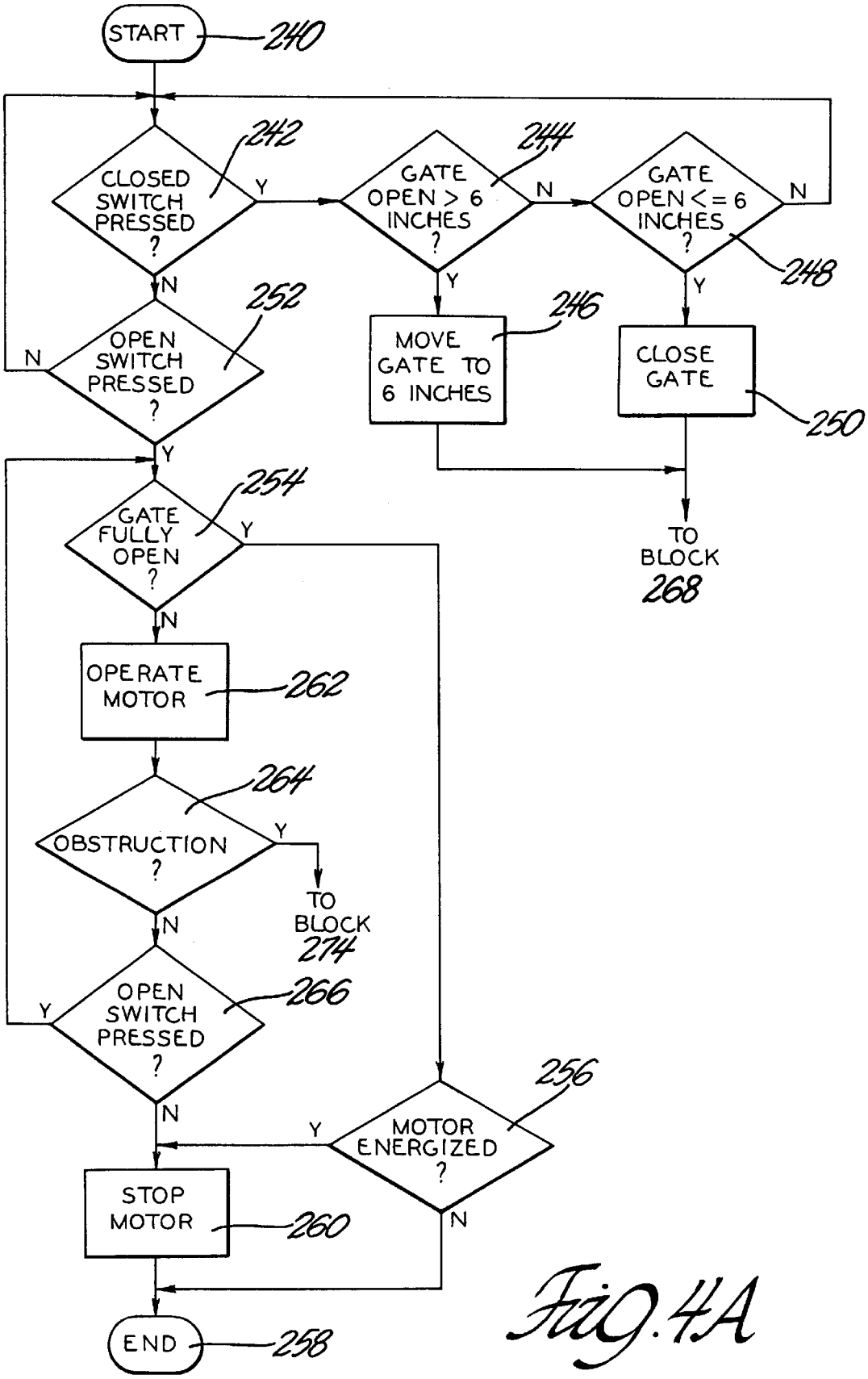
FIGS. 4A and 4B are block diagrams illustrating the operation of the electronic system in FIG. 3.
Figure 4B:
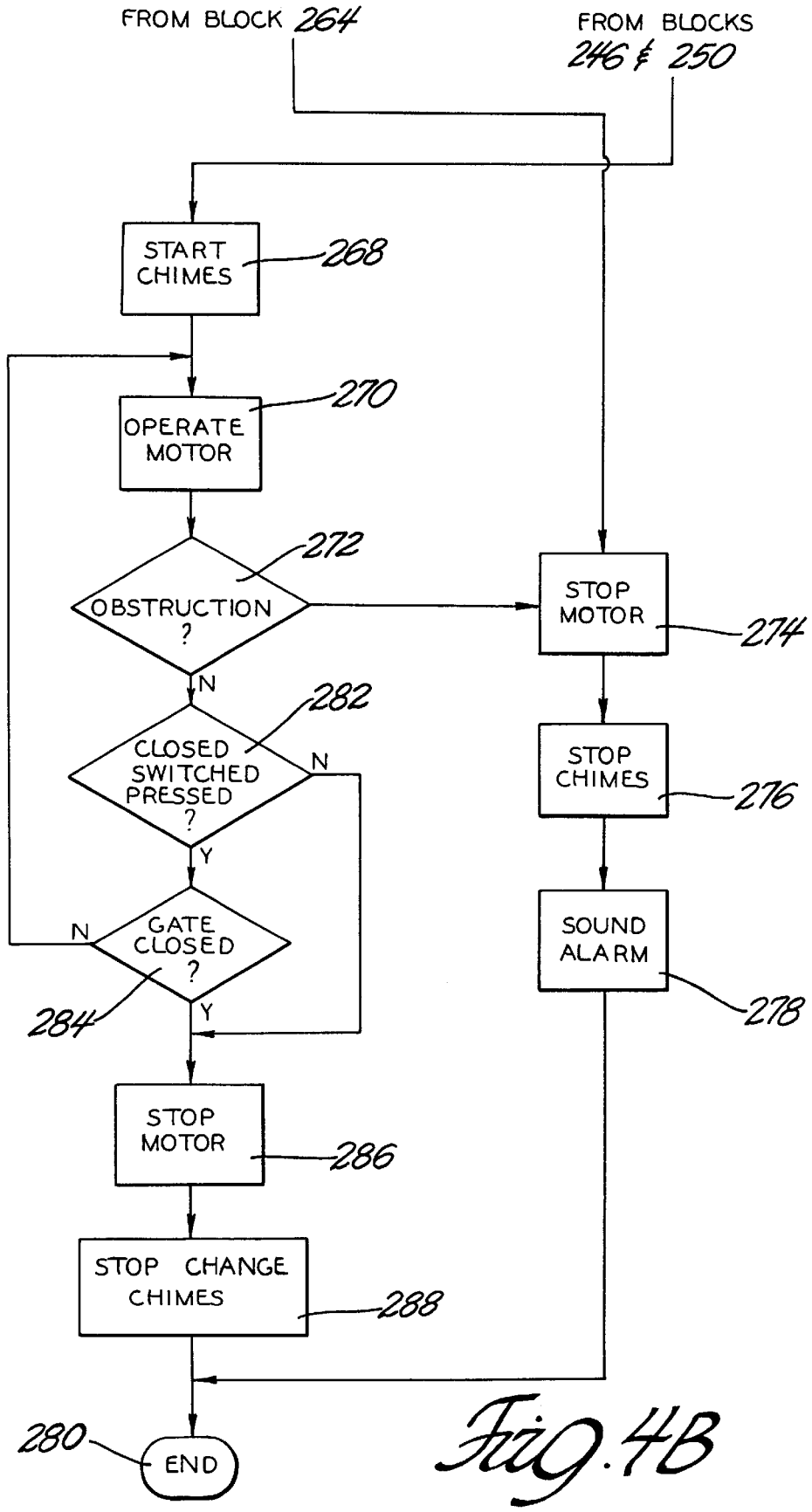

Referring now to FIGS. 4A and 4B, the operation of control circuit 100 in response to user input via the vehicle's interior switch (switch 116) will now be described. From a start block 240, the process moves to block 242 where a check is made by microprocessor 102 to determine if switch 116 has been activated to provide a closing signal. If so, the voltage provided to the feedback input of microprocessor 102 by potentiometer 106 is checked to determine if tailgate 14 is open more than six inches, as indicated at block 244. If so, then as long as switch 116 remains pressed by the user to provide the closing signal, the tailgate will be moved to its partially closed (six inch) position, as indicated by block 246, and the flow therefore moves to block 268 of FIG. 4B to so move tailgate 14. If, at block 244, tailgate 14 is not open more than six inches, then the process moves to block 248 to determine whether the tailgate is open. If so, then tailgate 14 must necessarily be six inches or less from the fully closed position, and the process therefore moves to the routine of FIG. 4B to fully close the tailgate, as indicated by block 250. If tailgate 14 is not open at all (i.e., it is fully closed), then no movement of the tailgate is needed and the process therefore returns to block 242.

If, at block 242, switch 116 is not activated to provide microprocessor 102 with a closing signal, then the process checks to determine whether switch 116 has been activated to provide an opening signal, as indicated at block 252. If not, then switch 116 is not being activated at all and the process will continue looping through blocks 242 and 252 until an opening or closing signal is detected. Of course, these blocks also check for generation of opening and closing signals by remote entry receiver 104. If microprocessor 102 is receiving an opening signal, then flow moves from block 252 to block 254 where a check is made to determine if tailgate 14 is fully open. If so, then tailgate 14 need not be opened further and the process therefore moves to block 256. If motor 28 is not energized, as in the case of the tailgate already being fully open when switch 116 is activated, then flow moves to block 258 where the process ends. If the motor is energized, as in the case of motor 28 having been operated to move tailgate 14 to its fully opened position, then the process moves to block 260 where the motor is shut off, with the process then ending at block 258.

If, at block 254, tailgate 14 is not fully opened, then the motor is operated in the opening mode, as indicated by block 262. As a part of this step, if the tailgate is fully closed, then solenoid 132 is first energized to unlatch tailgate 14. Once motor 28 is energized, microprocessor 102 monitors its status/pulse and feedback inputs to determine if the tailgate encounters any obstructions during opening. If so, then the process moves to block 274 of FIG. 4B to stop the motor, as will be described below. If no obstruction is detected, then flow moves to block 266 where switch 116 is again checked to determine if it is still being pressed to generate an opening signal. If so, flow moves back to block 254 to check the position of tailgate 14, as described above. As long as switch 116 remains activated and no obstruction is detected, the process will continue to loop through blocks 254, 262, 264, and 266 until the tailgate is at its fully opened position. If the user releases switch 116 before it arrives at its fully opened position, then flow moves from block 266 to block 260, where motor 28 is shut off, leaving tailgate 14 at its current position. Flow then ends at block 258.

The process of FIG. 4B is used to move tailgate 14 in the closing mode toward its fully closed position. This routine can be used regardless of whether the tailgate is being moved to its six inch position, as indicated by block 246 of FIG. 4A, or its fully closed position, as indicated by block 250 of FIG. 4A. Any differences in the two processes will be noted. The first step in the closing process is to start the chimes, which provide an audible signal to the user and other nearby persons that the tailgate is being closed. As mentioned briefly above, two distinctly different chime sounds are used during closing of the tailgate, depending upon whether the tailgate is open greater than six inches or within six inches or less of being fully closed. Thus, a person can determine without visual inspection of the position of the tailgate whether it is moving to its partially closed position or to its fully closed position. As mentioned above, the chime sounds are produced using data provided by microprocessor 102 to loudspeaker 52 via audio amplifier 114.

Once the chimes are started, the process moves to block 270, where microprocessor 102 energizes motor 28 in the closing mode. Thereafter, microprocessor 102 begins monitoring for an obstruction, as indicated by block 272. Process flow also moves to block 274 if an obstruction is detected during opening of tailgate 14, as mentioned above in connection with FIG. 4A. At block 274, motor 28 is shut off. Then, the chimes are stopped, as indicated by block 276. If desired, an audible alarm can then be broadcast, using loudspeaker 52, as indicated by block 278. The process then ends at block 280.

If, at block 272, no obstruction is detected, then the process moves to block 282 to determine whether switch 116 is still being activated to produce the closing signal. If so, then the process moves to block 284 to determine whether tailgate 14 is at its final position; i.e., whether the tailgate has arrived at the partially closed position or at the fully closed position. If the tailgate had been open greater than six inches when switch 116 was initially activated, then the test at block 284 determines whether tailgate 14 is at its partially closed position. If the tailgate had initially been open six inches or less, then the test at block 284 determines whether tailgate 14 is at its fully closed position. In either case, if the tailgate has not reached its final position, then the process returns to block 270 to continue operation of motor 28 and to continue monitoring for obstructions and deactivation of switch 116. If the tailgate has reached its final position or if, at block 282, switch 116 was no longer being activated, then the process moves to block 286 where the motor is shut off. Then, at block 288, if the tailgate has reached the partially closed position (it having been moved from an open position of greater than six inches), the chimes are changed to the second chime sound to indicate the arrival of the tailgate at the partially closed position. If, instead, the tailgate has reached the fully closed position (it having been moved from the partially closed position), the second chime sound is stopped and no further sounds are generated. Thereafter, the process ends at block 280.

The invention has been described with respect to presently preferred embodiments, and it is to be understood that the terminology that has been used is intended to be in the nature of words of description rather than words of limitation. Obviously, many modifications and variations of the present invention in light of the above teachings may by made. It is therefore to be understood that within the scope of the appended claims, the invention may be practiced otherwise than as specifically shown and described.

What is claimed is:

1. In combination, a motor vehicle body having a rear opening, a tailgate mounted for swinging movement on said vehicle body about an upper edge of said tailgate to open and close said rear opening, latch means operable to latch said tailgate to said vehicle body when said tailgate is swung to a fully closed position, said latch means including solenoid means operable on energization to unlatch said tailgate, a tailgate power actuator mechanism operable to swing said tailgate to open and close said rear opening, said tailgate power actuator mechanism including a reversible electric motor operable on energization in an opening mode to swing said tailgate to a fully open position and operable on energization in a closing mode to swing said tailgate to said fully closed position, an alarm device operable on energization in one sound mode to emit one kind of warning sound and on energization in another sound mode to emit another kind of warning sound, an electronic control system including a microprocessor controller operable to control energization of said solenoid means and said motor and said alarm device, manually controlled switch means operable to provide an opening signal and a closing signal to said controller, said controller responsive to said opening signal to energize said solenoid means to unlatch said tailgate and to energize said motor in said opening mode to move said tailgate toward said fully open position, said controller responsive to said closing signal to energize said motor in said closing mode to move said tailgate toward said fully closed position, obstruction signaling means operable to provide an obstruction signal to said controller in response to said tailgate contacting an obstacle during either opening or closing movement, said controller responsive to said obstruction signal to cease energization of said motor to stop said tailgate, tailgate position signaling means operable to provide a position signal indicative of tailgate position, said controller responsive to said position signal to cease energization of said motor when said motor is in said opening mode and said tailgate moves into said fully opened position, said controller responsive to said position signal to cease energization of said motor when said motor is in said closing mode and said tailgate moves into either said fully closed position or a predetermined partially closed position, said controller responsive to a repeated closing signal from said manually controlled switch means to energize said motor in said closing mode to move said tailgate from said partially closed position to said fully closed position, and said controller responsive to said position signal and said closing signal to energize said alarm device to emit said one kind of warning sound when said tailgate is moving between said fully opened position and said partially closed position and to emit said other kind of warning sound when said tailgate is moving between said partially closed position and said fully closed position.

2. The combination set forth in claim 1 wherein said position signaling means includes a potentiometer coupled to said motor to provide said position signal.

3. In combination, a motor vehicle body having a rear opening, a tailgate mounted for swinging movement on said vehicle body about an upper edge of said tailgate to open and close said rear opening, latch means operable to latch said tailgate to said vehicle body when said tailgate is swung to a fully closed position, said latch means including solenoid means operable on energization to unlatch said tailgate, a tailgate power actuator mechanism operable to swing said tailgate to open and close said rear opening, said tailgate power actuator mechanism including a reversible electric motor operable on energization in an opening mode to swing said tailgate to a fully open position and operable on energization in a closing mode to swing said tailgate to said fully closed position, an electronic control system including a microprocessor controller operable to control energization of said solenoid means and said motor, manually controlled switch means operable to provide an opening signal and a closing signal to said controller, said controller responsive to said opening signal to energize said solenoid means to unlatch said tailgate and to energize said motor in said opening mode to move said tailgate toward said fully open position, said controller responsive to said closing signal to energize said motor in said closing mode to move said tailgate toward said fully closed position, obstruction signaling means operable to provide an obstruction signal to said controller in response to said tailgate contacting an obstacle during either opening or closing movement, said controller responsive to said obstruction signal to cease energization of said motor to stop said tailgate, tailgate position signaling means coupled to said motor operable to provide a position signal indicative of tailgate position, said controller responsive to said position signal to cease energization of said motor when said motor is in said opening mode and said tailgate moves into said fully opened position, said controller responsive to said position signal to cease energization of said motor when said motor is in said closing mode and said tailgate moves into either said fully closed position or a predetermined partially closed position, and said controller responsive to a repeated closing signal from said manually controlled switch means to energize said motor in said closing mode to move said tailgate from said partially closed position to said fully closed position.

4. The combination set forth in claim 3 wherein said position signaling means includes a potentiometer having a wiper arm coupled to said motor to provide said position signal.

5. In combination, a motor vehicle body having a rear opening, a tailgate mounted for swinging movement on said vehicle body about an upper edge of said tailgate to open and close said rear opening, a tailgate power actuator mechanism operable to swing said tailgate to open and close said rear opening, said tailgate power actuator mechanism including a reversible electric motor operable on energization in an opening mode to swing said tailgate to a fully open position and operable on energization in a closing mode to swing said tailgate to said fully closed position, an electronic control system including a microprocessor controller operable to control energization of said motor, manually controlled switch means operable to provide an opening signal and a closing signal to said controller, said controller responsive to said opening signal to energize said motor in said opening mode to move said tailgate toward said fully open position, said controller responsive to said closing signal to energize said motor in said closing mode to move said tailgate to a predetermined partially closed position, obstruction signaling means operable to provide an obstruction signal to said controller in response to said tailgate contacting an obstacle during either opening or closing movement, said controller responsive to said obstruction signal to cease energization of said motor to stop said tailgate, tailgate position signaling means operable to provide a position signal indicative of tailgate position, said controller responsive to said position signal to cease energization of said motor when said motor is in said opening mode and said tailgate moves into said fully opened position, said controller responsive to said position signal to cease energization of said motor when said motor is in said closing mode and said tailgate moves into either a fully closed position or said predetermined partially closed position, and said controller responsive to a repeated closing signal from said manually controlled switch means to energize said motor in said closing mode to move said tailgate from said partially closed position to said fully closed position.

6. The combination set forth in claim 5 wherein said position signaling means includes a potentiometer having a wiper arm coupled to said motor to provide said position signal.

*7. A powered lift tailgate mechanism for use between a vehicle body and a tailgate comprising:*

*a drive system coupled to said vehicle body and to said tailgate, including an electric motor for generating mechanical forces to operate said tailgate; and*

*electronic controller for supplying operating current to said electric motor, said controller including a sensor which electrically monitors electrical operating conditions of said electric motor, said electronic controller automatically inhibiting the supply of operating current to said electric motor when said motor exhibits operating conditions beyond a predetermined set point indicative of a tailgate obstruction condition, said sensor electrically communicating with said electronic controller and providing said electrical operating conditions to said electronic controller, wherein said sensor is a MOSFET, said MOSFET electrically communicating with said motor to supply said operating current to said electric motor, said MOSFET having an output that provides a logic signal indicative of temperature conditions associated with the supplying of operating current to said electric motor, wherein said electronic controller is responsive to said MOSFET to automatically inhibit the supplying of operating current to said electric motor when said sensed temperature conditions exceed a predetermined condition indicative of a tailgate obstruction condition.*

*8. A powered lift tailgate mechanism as claimed in claim 7, wherein said sensor is a first pair and a second pair of said MOSFETs, said first pair of MOSFETs in electrical communication with said electric motor, said first pair of MOSFETs for providing said operating current to said electric motor in such a way as to turn said electric motor in a first direction said second pair of MOSFETs in electrical communication with said electric motor, said second pair of MOSFETs for providing said operating current to said electric motor in such a way as to turn said electric motor in a second direction.*

*9. A powered lift tailgate mechanism as claimed in claim 7, wherein said electronic controller includes an audible alarm responsive to said system, said audible alarm providing an audible signal when said motor exhibits operating conditions indicative of a tailgate obstruction condition.*

*10. A powered lift tailgate mechanism for use beetween a vehicle body and a tailgate comprising:*

*a drive system coupled to said vehicle body and to said tailgate, including an electric motor for generating mechanical forces to effect closing movement of said tailgate;*

*a position sensor means for providing an indication of the position of said tailgate and for defining a first range of positions and a second range of positions;*

*an electronic controller for suppling operating current to said electric motor, said controller including an audible signal generating system responsive to said position sensor; and*

*said audible signal generating system upon closing movement of said tailgate providing a first audible signal when said tailgate is within said first range of positions and providing a second audible signal when said tailgate is within said second range of positions.*

*11. A powered lift tailgate mechanism as claimed in claim 10, wherein said position sensor means is a potentiometer coupled to said electric motor, said potentiometer providing a position signal indicative of said position of said tailgate to said electronic controller, said audible signal generating system providing said first audible signal and said second audible signal in response to said position signal.*

*12. A powered lift tailgate mechanism as claimed in claim 10, further comprising:*

*a solenoid latching mechanism fixedly attached to said vehicle body; and*

*a microprocessor electronically communicating with said position sensor means, said electronic controller and said solenoid latching mechanism, said microprocessor providing a signal to said electronic controller to inhibit operating current to said electric motor and activate said solenoid latching mechanism when said position sensor means provides a signal indicative of said tailgate being in a fully closed position.*

*13. A powered lift tailgate mechanism as claimed in claim 10, wherein said first range of positions is greater than six inches and said second range of positions is less than and equal to six inches.*

*14. A powered lift tailgate mechanism as claimed in claim 10, wherein said audible signal generating system further comprises a piezoelectric element for generating said audible signal.*

*15. A powered lift tailgate mechanism for use between a vehicle body and a tailgate comprising:*

*a drive system coupled to said vehicle body and to said tailgate, including an electric motor for generating mechanical forces to operate said tailgate; and*

*electronic controller for supplying operating current to said electric motor, said controller including a sensor which electrically monitors electrical operating conditions of said electric motor, said electronic controller automatically inhibiting the supply of operating current to said electric motor when said motor exhibits operating conditions beyond a predetermined set point indicative of a tailgate obstruction condition, said sensor electrically communicating with said electronic controller and providing said electrical operating conditions to said electronic controller, wherein said sensor is an obstruction detection circuit, said obstruction detection circuit being in sensing communication with said electric motor and providing a pulse train indicative of motor speed to a logic circuit receptive of said pulse train and operative to inhibit said operating current when said motor speed drops below a predetermined value indicative of said tailgate obstruction condition.*

*16. A powered lift tailgate mechanism as claimed in claim 15, wherein said electronic controller includes an audible alarm responsive to said system, said audible alarm providing an audible signal when said motor exhibits operating conditions indicative of a tailgate obstruction condition.*

*17. A powered lift tailgate mechanism for use between a vehicle body and a tailgate comprising:*

*a drive system coupled to said vehicle body and to said tailgate, including an electric motor for generating mechanical forces to operate said tailgate; and*

*electronic controller for supplying operating current to said electric motor, said controller including a sensor which electrically monitors electrical operating conditions of said electric motor, said electronic controller automatically inhibiting the supply of operating current to said electric motor when said motor exhibits operating conditions beyond a predetermined set point indicative of a tailgate obstruction condition, said sensor electrically communicating with said electronic controller and providing said electrical operating con-*

*ditions to said electronic controller, wherein said sensor is a potentiometer, said potentiometer coupled to said tailgate, a microprocessor electrically communicating with said potentiometer, said potentiometer providing a position signal to said microprocessor indicative of a position of said tailgate, said microprocessor further comprising a means for calculating a rate of change of position of said tailgate based on said position signal, said microprocessor inhibiting said operating current when said rate of change drops below a predetermined value which is indicative of said tailgate obstruction condition.*

*18. A powered lift tailgate mechanism as claimed in claim 17 wherein said electronic controller includes an audible alarm responsive to said system, said audible alarm providing an audible signal when said motor exhibits operating conditions indicative of a tailgate obstruction condition.*

*19. A powered lift tailgate mechanism for use between a vehicle body and a tailgate comprising:*

*a drive system coupled to said vehicle body and to said tailgate, including an electric motor for generating mechanical forces to operate said tailgate;*

*an electronic controller for supplying operating current to said electric motor, said controller including an obstruction detection circuit to monitor operating conditions of said drive system, said electronic controller automatically inhibiting the supply of operating current to said electric motor when said obstruction detection circuit indicates operation of said drive system beyond a predetermined set point indicative of a tailgate obstruction condition, and*

*a remote entry receiver for receiving a wireless transmission, said signal receiver providing one of an opening and a closing signal to said electronic controller upon receipt of said transmission, said electronic controller supplying operating current to move said tailgate in one of an opening and a closing direction in response to said one of an opening and a closing signal.*

*20. A powered lift tailgate mechanism for use between a vehicle body and a tailgate comprising:*

*a drive system coupled to said vehicle body and to said tailgate, including an electric motor for generating mechanical forces to operate said tailgate; and*

*an electronic controller for supplying operating current to said electric motor, said controller including a sensor which provides a logic signal indicative of temperature conditions associated with the supplying of operating current to said electric motor, wherein said electronic controller electrically communicates with said sensor and is responsive to said logic signal to automatically inhibit the supplying of operating current to said electric motor when said sensed temperature conditions exceed a predetermined condition indicative of a tailgate obstruction condition.*

*21. A powered lift tailgate mechanism for use between a vehicle body and a tailgate comprising:*

*a drive system coupled to said vehicle body and to said tailgate, including an electric motor for generating mechanical forces to operate said tailgate; and*

*an electronic controller for supplying operating current to said electric motor, said controller including an obstruction detection circuit, said obstruction detection circuit being in sensing communication with said electric motor and providing a pulse train indicative of motor speed to a logic circuit receptive of said pulse train and operative to inhibit said operating current when said motor speed drops below a predetermined value indicative of said tailgate obstruction condition.*

*22. A powered lift tailgate mechanism for use between a vehicle body and a tailgate comprising:*

*a drive system coupled to said vehicle body and to said tailgate, including an electric motor for generating mechanical forces to operate said tailgate; and*

*an electronic controller for supplying operating current to said electric motor, said controller including a potentiometer providing a position signal indicative of a position of said tailgate, wherein said electronic controller electrically communicates with said potentiometer and is responsive to said position signal to automatically inhibit said operating current when a rate of change of said position drops below a predetermined value which is indicative of a tailgate obstruction condition.*

* * * * *